(12) United States Patent
Zemenchik (10) Patent No.: US 11,185,011 B2
(45) Date of Patent: Nov. 30, 2021

(54) SYSTEM AND METHOD FOR PERFORMING CUTTING OPERATIONS USING AN ULTRASONIC CUTTING MEMBER OF AN AGRICULTURAL IMPLEMENT

(71) Applicant: CNH Industrial America LLC, New Holland, PA (US)

(72) Inventor: Robert A. Zemenchik, Kenosha, WI (US)

(73) Assignee: CNH Industrial America LLC, New Holland, PA (US)

( * ) Notice: Subject to any disclaimer, the term of this patent is extended or adjusted under 35 U.S.C. 154(b) by 429 days.

(21) Appl. No.: 16/107,162

(22) Filed: Aug. 21, 2018

(65) Prior Publication Data
US 2020/0060079 A1 Feb. 27, 2020

(51) Int. Cl.
| | |
|---|---|
| *A01D 34/40* | (2006.01) |
| *A01D 34/01* | (2006.01) |
| *A01D 41/14* | (2006.01) |
| *A01D 34/408* | (2006.01) |
| *A01D 41/06* | (2006.01) |
| *A01D 34/135* | (2006.01) |
| *A01D 34/404* | (2006.01) |

(52) U.S. Cl.
CPC ............ *A01D 34/40* (2013.01); *A01D 34/015* (2013.01); *A01D 34/135* (2013.01); *A01D 34/404* (2013.01); *A01D 34/408* (2013.01); *A01D 41/06* (2013.01); *A01D 41/14* (2013.01)

(58) Field of Classification Search
CPC .... A01D 34/38; A01D 34/408; A01D 34/135; A01D 34/40; A01D 34/13; A01D 41/06; A01D 34/30; A01D 34/02; A01D 34/14; A01D 34/015; A01D 41/14; B60B 3/00; B29C 65/08; B29C 66/9512; B25D 11/00; B25D 11/064; A01B 11/00
USPC ............. 56/13.6, 264, 296; 310/317, 323.18, 310/323.19
See application file for complete search history.

(56) References Cited

U.S. PATENT DOCUMENTS

| | | |
|---|---|---|
| 3,231,025 A | 1/1966 | Bodine |
| 3,563,316 A | 2/1971 | Shatto |
| 3,597,906 A | 8/1971 | Bodine |
| 3,613,799 A | 10/1971 | Bodine |

(Continued)

OTHER PUBLICATIONS

Ralf Kattenstroth, Jun. 2010, XVIIth World Congress of the International Commision of Agricultural and Biosystems Engineering (CIGR), Reducing Friction by Ultrasonic Vibration Exemplified by Tillage.*

(Continued)

*Primary Examiner* — Adam J Behrens
(74) *Attorney, Agent, or Firm* — Rebecca L. Henkel; Rickard K. DeMille (57) ABSTRACT

A system and method for performing cutting operations with an agricultural implement includes a cutting member capable of cutting plant material supported on the agricultural implement. A vibration source is operatively coupled to the cutting member. The vibration source is configured to generate a vibrational output at an ultrasonic frequency which is transmitted to the cutting member. The vibrational output is propagated through at least a portion of the cutting member to vibrate the cutting member as the plant material is being severed during the performance of the cutting operation.

10 Claims, 9 Drawing Sheets

(56) References Cited

U.S. PATENT DOCUMENTS

| | | | | |
|---|---|---|---|---|
| 3,747,687 A * | 7/1973 | Bodine | .................. | A01B 45/02 |
| | | | | 172/40 |
| 4,040,261 A | 8/1977 | Schuck et al. | | |
| 4,380,889 A * | 4/1983 | Isbell | ..................... | A01D 34/13 |
| | | | | 56/296 |
| 4,463,509 A | 8/1984 | Leonard | | |
| 5,271,470 A | 12/1993 | King et al. | | |
| 5,454,433 A | 10/1995 | Worrel et al. | | |
| 5,828,156 A * | 10/1998 | Roberts | ..................... | B06B 3/00 |
| | | | | 310/317 |
| 6,530,768 B1 * | 3/2003 | Harrop | ..................... | B06B 3/02 |
| | | | | 425/174.2 |
| 7,578,356 B2 | 8/2009 | Newman | | |
| 7,658,059 B2 * | 2/2010 | Majkrzak | ............... | A01D 34/38 |
| | | | | 56/264 |
| 8,312,701 B1 * | 11/2012 | Albarran | ................ | A01D 45/26 |
| | | | | 56/327.1 |
| 8,671,596 B2 * | 3/2014 | Manion | ..................... | F25C 5/12 |
| | | | | 37/219 |
| 8,701,790 B2 | 4/2014 | Carothers | | |
| 8,757,295 B2 | 6/2014 | Hoff | | |
| 8,910,727 B2 * | 12/2014 | Bar-Cohen | ........... | B25D 11/064 |
| | | | | 173/142 |
| 2006/0156590 A1 | 7/2006 | Capolupo | | |
| 2007/0277985 A1 | 12/2007 | Hager et al. | | |
| 2011/0139476 A1 * | 6/2011 | Roser | ..................... | A01G 3/033 |
| | | | | 173/141 |
| 2017/0298593 A1 | 10/2017 | Dorin et al. | | |

OTHER PUBLICATIONS

Liu et al., Ultrasonic Cutting of Energy Crops, Research Gate, Conference: 2012 ASABE Annual International Meeting, Dallas, TX. Jul. 29-Aug. 1, 2012, pp. 214-225. (Abstract Only) https://www.researchgate.net/publication/256476174_Ultrasonic_Cutting_of_Energy_Crops.

* cited by examiner

SYSTEM AND METHOD FOR PERFORMING CUTTING OPERATIONS USING AN ULTRASONIC CUTTING MEMBER OF AN AGRICULTURAL IMPLEMENT

FIELD

The present disclosure generally relates to agricultural implements and, more particularly, to systems and methods for performing cutting operations with an agricultural implement in which plant material is cut using one or more implement-based ultrasonic cutting members.

BACKGROUND

Many agricultural operations require the cutting of plant material. In some instances, such as during harvesting, the plant material is standing and may be mature when it is cut. In other instances, the plant material has been previously cut but must be further processed again as it is gathered and baled. In still other instances, the plant material constitutes crop residue covering a field which must be sized via cutting during tillage operations.

Traditionally, both crops and crop residue are severed by purely mechanical means. In the majority of the agricultural industry, steel tools are pulled, pushed, or swung to sever the plant material regardless of the configuration or field conditions in which it is encountered. The requirement to cut the crops and crop residue with purely mechanical means limits the speed of an agricultural implement when encountering plant material, increases the weight of the implement, drives an increase in the amount of power required to drive the cutter, and increases the wear of mechanical systems, which are very expensive to maintain and replace.

Accordingly, an improved system and method for performing agricultural cutting operations would be welcomed in the technology.

BRIEF DESCRIPTION

Aspects and advantages of the technology will be set forth in part in the following description, or may be obvious from the description, or may be learned through practice of the technology.

In accordance with one embodiment of the present disclosure, a system for performing cutting operations with an agricultural implement is provided. The system includes a cutting member capable of cutting plant material. The cutting member is supported on the agricultural implement. A vibration source is operatively coupled to the cutting member. The vibration source is configured to generate a vibrational output at an ultrasonic frequency which is transmitted to the cutting member. The vibrational output is propagated through at least a portion of the cutting member to vibrate the cutting member as the plant material is being cut during the performance of the cutting operation.

In accordance with another embodiment of the present disclosure, a harvesting implement for an agricultural harvester is provided. The harvesting implement includes a frame supporting a cutter bar, with the cutter bar being configured to sever standing plant material as the harvesting implement is moved across a field. A vibration source is operatively coupled to the cutter bar and configured to generate a vibrational output at an ultrasonic frequency that is transmitted to the cutter bar. The vibrational output is propagated through at least a portion of the cutter bar to vibrate the cutter bar as the standing plant materials are being severed from the field during cutting operations. The severed plant material is transported away from the cutter bar by a harvested crop transport assembly.

In accordance with another embodiment of the present disclosure, a method for performing cutting operations with an agricultural implement is provided. The method includes moving an agricultural implement with a cutting member through a field and activating a vibration source operatively coupled to the cutting member so that the vibration source generates a vibrational output at an ultrasonic frequency. The vibrational output is transmitted to the cutting member. The method also includes performing a cutting operation with the cutting member as the agricultural implement is moved through the field during which a plant material is cut by the cutting member, with the vibrational output generated by the vibration source being propagated through at least a portion of the cutting member to vibrate the cutting member during the performance of the cutting operation.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for performing agricultural cutting operations with an agricultural implement. Specifically, in several embodiments, an agricultural implement may include one or more cutting members provided in operative association with a vibration source(s) configured to vibrate the cutting member(s) at a given frequency to increasing the cutting performance of such member(s). As a result, the vibrating cutting member(s) may be configured to efficiently and effectively cut plant material within a field as the implement as moved across the field during the performance of a cutting operation.

In several embodiments, the cutting member(s) may be configured to be vibrated at or otherwise exposed to a vibrational input within the ultrasonic frequency range. Specifically, in one embodiment, the vibration source(s) may be configured to generate a vibrational output in the ultrasonic frequency range that is transmitted to the cutting member(s). In response to such a high-frequency vibrational input, the cutting member(s) may vibrate at a corresponding frequency to facilitate the cutting of plant material during the performance of an agricultural cutting operation.

It should be appreciated that the ultrasonic cutting members described herein may be installed on or otherwise form part of any suitable agricultural implement configured to perform a cutting operation during which plant material is being cut. Specifically, as will be described below, in several embodiments, the disclosed cutting members may be utilized as one or more of the cutting devices of a harvesting implement (e.g., a header) of a harvester to facilitate the harvesting of standing crop. In other embodiments, the disclosed cutting members may be utilized as one or more of the ground-engaging tools of a tillage implement to facilitate the cutting of crop residue within a field, such as one or more discs of the tillage implement. In further embodiments, the disclosed cutting members may be utilized within any other suitable agricultural implements.

Figure 1:
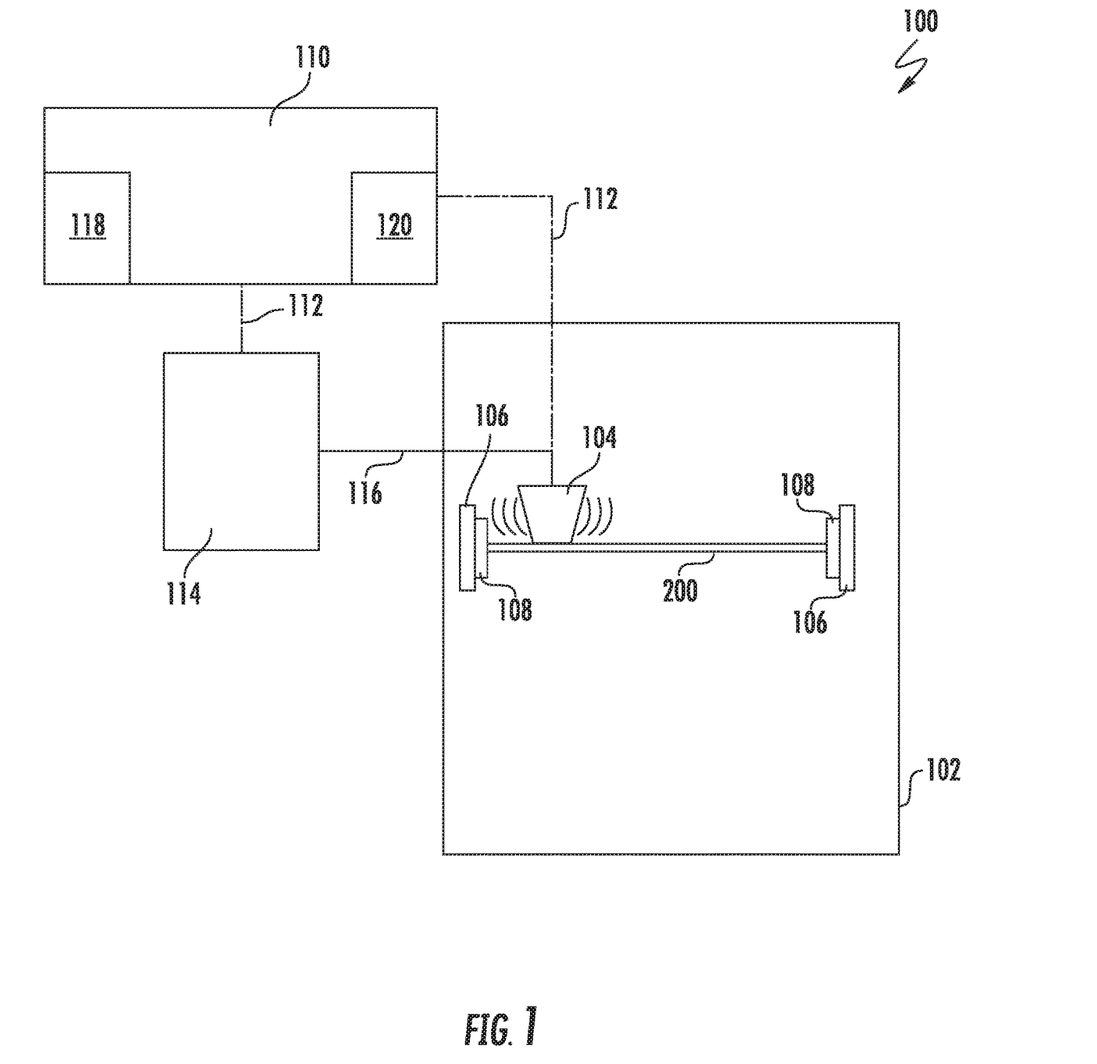
FIG. 1 illustrates a schematic view of one embodiment of an agricultural implement employing ultrasound in cutting operations in accordance with aspects of the present subject matter, particularly illustrating a schematic view of an ultrasonic cutting member configured for use with an agricultural implement.

Referring now to the drawings, FIG. 1 illustrates a schematic view of one embodiment of a system 100 for performing agricultural cutting operations in accordance with aspects of the present subject matter. For purposes of illustration, the system 100 is schematically shown in FIG. 1 as being installed in association with a cutting member 200 of an agricultural implement (indicated simply by box 102). As will be described below, the implement 102 may generally correspond to any suitable agricultural implement configured to perform or facilitate the performance of a cutting operation during which plant material is cut or severed, such as a harvesting implement (e.g., a header), a tillage implement, and/or any other suitable implement (e.g., a baler, forage harvester). As a result, it should be appreciated that, depending on the specific type of agricultural implement within which the disclosed system 100 is being utilized, the cutting member 200 may correspond to any suitable type of implement-based device or tool configured to cut or sever plant material, such as the cutter bar of a harvesting implement used to sever or cut standing crop from a field or a ground-engaging tool of a tillage implement (e.g., a disc) used to sever or cut crop residue within a field and/or any other suitable device and/or tool (e.g., a forage harvester knife, a baler knife, and/or the like).

As shown in FIG. 1, in several embodiments, the system 100 includes one or more vibration sources 104 configured to be provided in operative association with the cutting member 200 such that vibrational energy from the vibration source(s) 104 may be transmitted to the cutting member 200. Specifically, in one embodiment, the vibration source(s) 104 is configured to generate a wave or vibrational output that is transmitted to the cutting member 200, thereby causing the cutting member 200 to vibrate. For example, in accordance with aspects of the present subject matter, the vibration source(s) 104 is configured to generate the vibrational output at a frequency within the ultrasonic frequency range such that the cutting member 200 is vibrated at a corresponding high frequency in order to improve the efficiency and/or effectiveness of the cutting member 200 in cutting plant material.

In general, the vibration source(s) 104 may correspond to any suitable device(s) or member configured to generate a vibrational output at the desired frequency that is capable of being transmitted to the cutting member 200. For instance, in several embodiments, the vibration source(s) 104 may correspond to one or more transducers. In such embodiments, the transducer(s) may be configured to generate a wave output within the ultrasonic frequency range that is transmitted to the cutting member 200, such as by converting electrical signals received by the transducer(s) into ultrasonic sound waves. The sound waves transmitted to the cutting member 200 may then propagate therethrough to cause the cutting member 200 to vibrate. In other embodiments, the vibration source(s) 104 may be any other suitable device capable of generating vibrations in the desired frequency range. For example, the vibration source(s) 104 may correspond to one or more piezoelectric elements, eccentric rotating masses, linear resonant actuators, accelerated rams, electric motors, hydraulic motors, and/or any other suitable technology capable of developing vibrational outputs within the ultrasonic frequency range.

It should be appreciated that, in several embodiments, the vibrational outputs from the vibration source(s) 104 may be associated with any suitable frequency within the ultrasonic frequency range. However, in a particular embodiment, the vibrational outputs may be at a frequency ranging from 1 megahertz (MHz) to 50 MHz, such as from 2 MHz to 40 Mz or from 5 MHz to 30 MHz or from 10 MHz to 20 MHz and/or any other suitable ranges therebetween. Additionally, in one embodiment, the vibrational outputs may be at a frequency ranging from 10 MHz to 20 MHz, such as from 12 MHz to 18 Mz or from 14 MHz to 16 MHz and/or any other suitable ranges therebetween.

It should also be appreciated that the vibration source(s) 104 may be mounted relative to the cutting member 200 in any manner that allows the vibrational output of the vibration source(s) 104 to be transmitted to the cutting member(s) 200. For instance, in one embodiment, the vibration source (s) 104 may be coupled to the cutting member 200 (e.g., directly or indirectly) to allow the vibrational output to be transmitted to the cutting member(s) 200. In another embodiment, the vibration source(s) 104 may be positioned in direct or indirect contact with or in close proximity to the cutting member 200 to allow the vibrational output to be transmitted to the cutting member(s) 200.

Additionally, as shown in FIG. 1, the system 100 may also include one more vibrational dampers or isolators 108 for isolating the vibrating cutting member 200 from one or more other components of the agricultural implement 102, such as one or more structural components of the implement 102. For instance, in several embodiments, the cutting member 200 may be supported relative to the ground via a frame 106 of the implement 102. In such embodiments, the vibrational isolator(s) 108 may be coupled between the cutting member 200 and the frame 106 to reduce the amount of vibrational energy transmitted from the cutting member 200 to the frame 106. For instance, in one embodiment, the vibrational isolator(s) 108 may be configured to completely or substantially isolate the cutting member 200 from the implement's frame 106 such that little or no vibrational energy is transmitted from the cutting member 200 to the frame 106. In another embodiment, the vibrational isolator(s) 108 may simply be configured to dampen the vibrational energy transmitted from the cutting member 200.

It should be appreciated that, although not shown in FIG. 1, a vibrational damper or isolator(s) 108 may also be provided in operative association with the vibration source (s) 104 to reduce the amount of vibrational energy transmitted from the vibration source(s) 104 to components of the implement 102 other than the cutting member 200, such as structural components of the implement 102 (e.g., the frame 106). Additionally, it should be appreciated that the vibrational isolator(s) 108 may generally correspond to any suitable component or member capable of isolating or damping vibrational energy, such as rubber-based dampers or isolators or any other suitable vibrational damping/isolating structure or component.

Referring still to FIG. 1, the system 100 also includes a controller 110 configured to control the operation of the vibration source(s) 104. Specifically, in several embodiments, the controller 110 may be configured to activate the vibration source(s) 104 when the cutting member 200 is being used to perform the cutting operation and deactivate the vibration source(s) 104 during non-operational periods. For instance, when the system 100 is configured for use with a harvesting implement, the controller 110 may be configured to activate the vibration source(s) 104 when the harvesting implement is lowered into a working position for performing a harvesting operation (e.g., at the headlands). Additionally, the controller 110 may be configured to deactivate the vibration source(s) 104 when the implement is not being used to perform a cutting operation, such as when the implement is being raised during field turns, transported between fields, or is otherwise configured in a transport or road mode.

As shown in FIG. 1, in one embodiment, the controller 110 may be communicatively coupled to the vibration source(s) 104 (e.g., via a communicative link 112) to allow the controller 110 to directly control the operation of the vibration source(s) 104. In addition (or as an alternative thereto), the controller 110 may be communicatively coupled to one or more components configured to facilitate or adjust the operation of the vibration source(s) 104. For instance, as shown in FIG. 1, the controller 110 may be communicatively coupled to a power source 114 (e.g., via communicative link 112) configured to supply power to the vibration source(s) 104 (e.g., via a power link 116) In such an embodiment, the power source 114 may be installed on the implement 102 or the power may be supplied by an associated vehicle (e.g., a harvester or tractor) to which the implement 102 is coupled and may correspond to an application-specific power source provided specifically to supply power to the vibration source(s) 104 or a shared or common power source configured to provide power to various components of the implement 102 and/or the associated vehicle (e.g., such as an on-board generator provided on the vehicle).

It should be appreciated that the controller 110 may generally comprise any suitable processor-based device known in the art, such as one or more computing devices. Thus, in several embodiments, the controller 110 may include one or more processor(s) 118 and associated memory device(s) 120 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 120 of the controller 110 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 120 may generally be configured to store suitable computer-readable instructions that, when implemented by the processor(s) 118 and configure the controller 110 to perform various computer-implemented functions, such as the method 600 described below with reference to FIG. 9. In addition, the controller 110 may also include various other suitable components, such as a communications circuit or module, one or more input/output channels, a data/control bus and/or the like.

It should also be appreciated that the controller 110 may correspond to an existing controller of the implement (or the vehicle to which the implement is coupled) or the controller 110 may correspond to a separate controller. For instance, in one embodiment, the controller 110 may form all or part of a separate plug-in module that may be installed on the implement (or associated vehicle) to allow for the disclosed system and method to be implemented without requiring additional software to be uploaded onto existing control devices of the implement (or associated vehicle).

Figure 2:
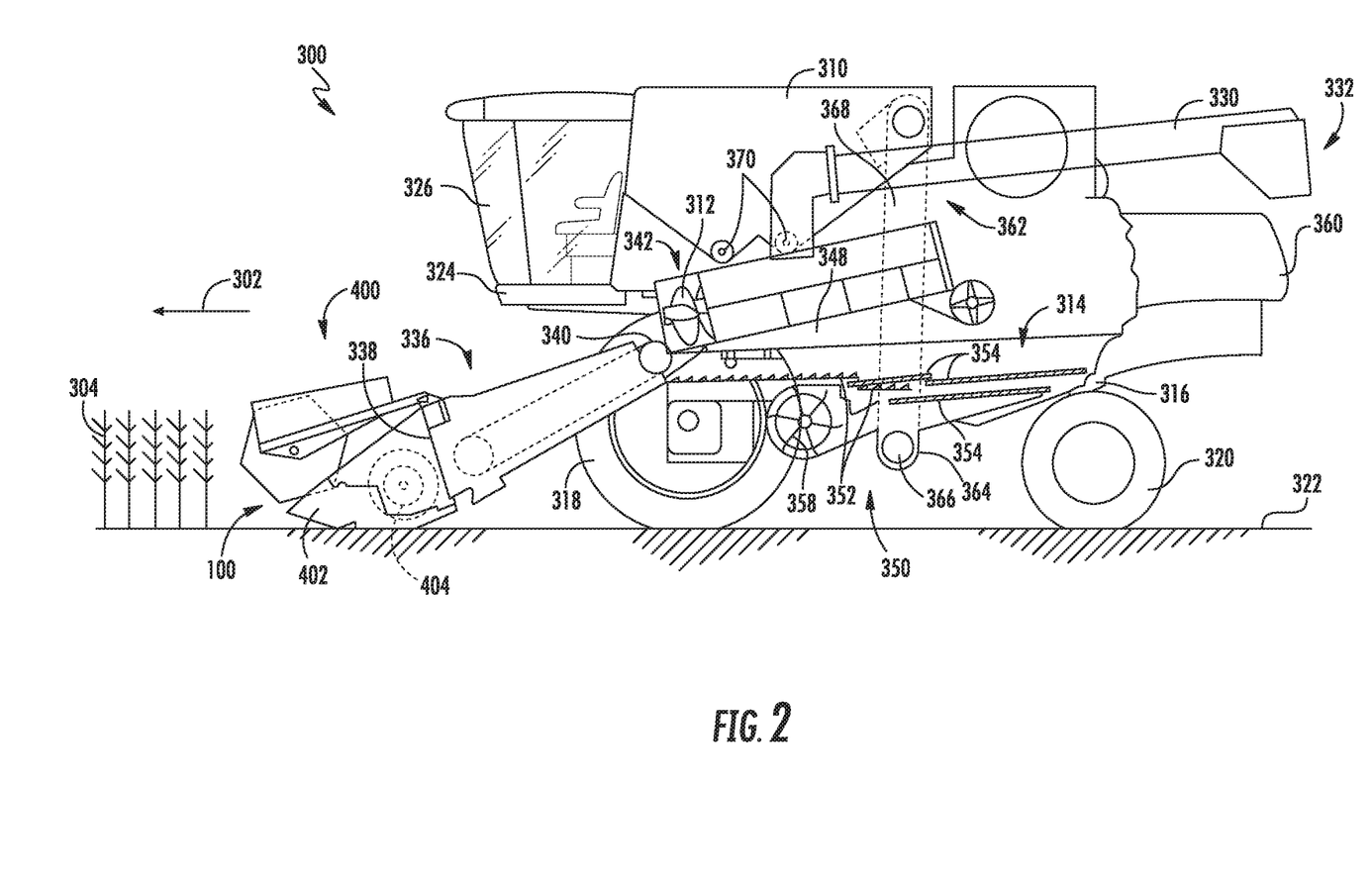
FIG. 2 illustrates a side view of one embodiment of a harvester, particularly illustrating the harvester including a header within which one or more ultrasonic cutting members can be installed in accordance with aspects of the present subject matter.

Referring now to FIG. 2, one embodiment of a vehicle and associated implement in which aspects of the disclosed system 100 may be utilized is illustrated in accordance with aspects of the present subject matter. Specifically, in the illustrated embodiment, an agricultural harvester 300 is shown including a harvesting implement (e.g., a header) configured to sever standing plant materials from a field. In general, the harvester 300 may be configured to move across a field in a direction of travel (e.g., as indicated by arrow 302) to harvest a standing or windrowed crop 304. While traversing the field, the harvester 300 may be configured to process the harvested crop material and store cleaned crop material within a grain or crop storage tank 310 of the harvester 300. In one embodiment, the harvester 300 may be configured as an axial-flow type combine, wherein the harvested crop material is threshed and separated while the crop material is advanced by and along a longitudinally arranged rotor 312. However, it should be appreciated that, in alternative embodiments, the harvester 300 may have any suitable harvester configuration. Further, in accordance with aspects of the present subject matter, the harvester 300 may be configured to clean the harvested crop material via one or more components of a crop processing system 314 of the harvester 300.

As shown in FIG. 2, the harvester 300 may include a chassis or main frame 316 configured to support and/or couple to various components of the harvester 300. For example, in several embodiments, the harvester 300 may include a pair of driven, ground-engaging front wheels 318 and a pair of steerable rear wheels 320 that are coupled to the frame 316. As such, the wheels 318, 320 may be configured to support the harvester 300 relative to a ground surface 322 and move the harvester 300 in the forward direction of travel 302 relative to the ground surface 322. Furthermore, the harvester 300 may include an operator's platform 324 having an operator's cab 326, and the crop processing system 314, all of which may be supported by the frame 316. As will be described below, the crop processing system 314 may be configured to perform various processing operations on the harvested crop material as the crop processing system 314 operates to clean the crop material between a harvesting implement (e.g., header 400) of the harvester 300 and the crop storage tank 310. An unloading system 330 may be configured to convey the cleaned crop material from the crop storage tank 310 to an associated discharge location 332 on the harvester 300. Additionally, as is generally understood, the harvester 300 may include an engine and a transmission mounted on the frame 316. The transmission may be operably coupled to the engine and may provide variably adjusted gear ratios for transferring engine power to the wheels 318, 320 via a drive axle assembly (or via axles if multiple drive axles are employed).

As shown in FIG. 2, the header 400 and an associated feeder 336 of the crop processing system 314 may extend forward of the frame 316 and may be pivotally secured thereto for generally vertical movement. In general, the feeder 336 may be configured to serve as support structure for the header 400 and may incorporate or be coupled to components of a frame of the header 400. For example, the feeder 336 may extend between a front end 338 coupled to the header 400 and a rear end 340 positioned adjacent to a threshing and separating assembly 342 of the crop processing system 314. As is generally understood, the rear end 340 of the feeder 336 may be pivotally coupled to a portion of the harvester 300 to allow the front end 338 of the feeder 336 and, thus the header 400, to be moved upward and downward relative to the ground 322 to set the desired harvesting or cutting height for the header 400.

As the harvester 300 is propelled forwardly over the field with the standing crop 304, the crop material is severed from the standing crop by a cutter bar 402 at the front of the header 400 and delivered by components of a crop transport assembly 422 (e.g., a header auger 404) to the front end 338 of the feeder 336, which transports the severed plant materials away from the cutter bar and supplies the harvested crop material to the threshing and separating assembly 342. As is generally understood, the threshing and separating assembly 342 may include a cylindrical chamber 348 in which the rotor 312 is rotated to thresh and separate the harvested crop material received therein. That is, the harvested crop material is rubbed and beaten between the rotor 312 and the inner surfaces of the chamber 348, whereby the grain, seed, or the like, is loosened and separated from the straw.

The harvested crop material that has been separated by the threshing and separating assembly 342 may fall onto a crop cleaning assembly 350 of the crop processing system 314. In general, the crop cleaning assembly 350 may include a series of pans 352 and associated sieves 354. As is generally understood, the separated crop material may be spread out via oscillation of the pans 352 and/or sieves 354 and may eventually fall through apertures or openings (not shown) defined in the sieves 354. Additionally, a cleaning fan 358 may be positioned adjacent to one or more of the sieves 354 to provide an air flow through the sieves 354 that removes chaff and other impurities, or more generally material other than grain (MOG), from the crop material. For instance, the fan 358 may blow the impurities off of the crop material for discharge from the harvester 300 through the outlet of a straw hood 360 positioned at the back end of the harvester 300. The fan 358 may also assist movement of the crop material along the sieves 354. The cleaned crop material passing through the sieves 354 may then be directed towards a crop delivery apparatus 362, such as a combination of an auger 366 positioned within a trough 364 and an elevator assembly 368, which may be configured to transfer the cleaned harvested crop to the crop storage tank 310. The cleaned crop material contained within the crop storage tank 310 may then be delivered to the unloading system 330 via one or more cross-augers 370 positioned at the bottom of the tank 310.

It should be appreciated that, although FIG. 2 depicts the vehicle as being configured as a combine harvester, such illustration is not intended to limit the present subject matter to the depicted form. Rather, aspects of the disclosed system and method may be employed in any other agricultural harvester or other agricultural machine that is designed to sever standing plant materials and/or support an implement configured to sever standing plant materials or process or package post-drying forages. For example, in other embodiments, aspects of the disclosed system and method may be utilized within a silage harvester, a swather, a windrower, a baler, a sugarcane harvester, a mower, or any other machine/ implement intended to sever standing plant materials or post-drying forages.

Figure 3:
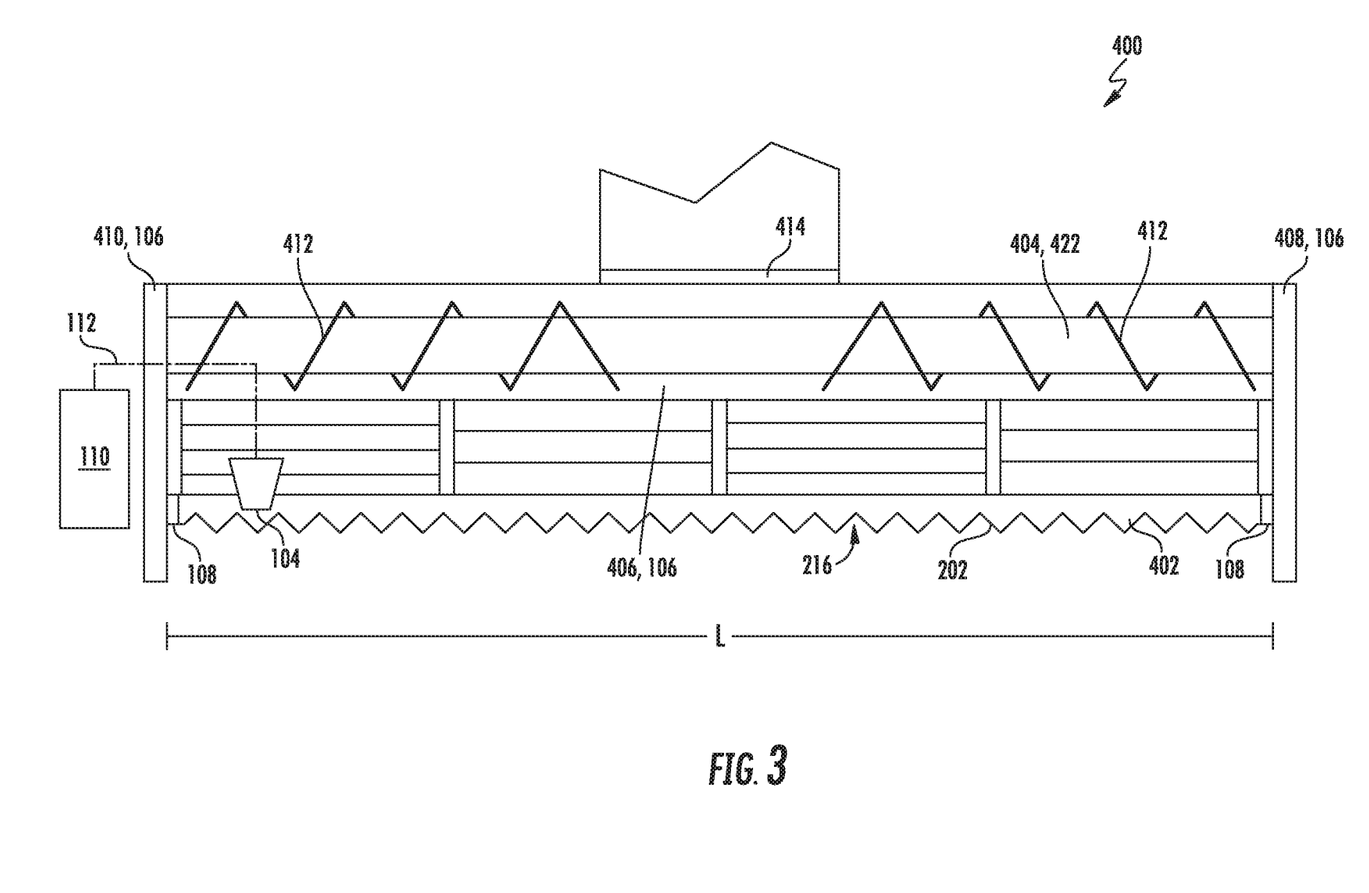
FIG. 3 illustrates a top, schematic view of the header of the harvester shown in FIG. 2, particularly illustrating the header including an ultrasonic cutting member in accordance with aspects of the present subject matter.

Referring now to FIG. 3, a schematic, overhead view of one embodiment of the header 400 of the harvester 300 shown in FIG. 2 is illustrated in accordance with aspects of the present subject matter, particularly illustrating aspects of the disclosed system 100 incorporated within or otherwise provided in association with the header. As depicted, the agricultural header 400 is configured as an auger-type header, but the present subject matter is not limited to auger-type headers and may be employed in any agricultural header (e.g., within belt conveyer-type headers employing a belt-based conveyer systems to transport harvester crop to the associated feeder).

As shown, the header 400 generally includes a frame 106 having a plurality of frame components, such as a base frame member 406 defining a floor surface that extends over substantially the complete width of the header 400. In addition, the frame 106 includes side frame members 408, 410 disposed at the opposed lateral ends of the base frame member 406. In one embodiment, the side frame members 408, 410 may be configured to support drive components for driving and/or actuating one or more components of the header 400. Additionally, an auger 404 is supported by the frame 106, such as at a location directly above the base frame member 406. The auger includes a helical screw blade 412 configured to be rotated to transport harvester crop material towards a discharge opening 414 of the agricultural header 400. As is generally understood, the discharge opening 414 is aligned with the front end 338 of the feeder 336 such that the harvester crop material transported to the discharge opening 414 can be subsequently delivered to the threshing and separating assembly via the header. In the illustrated embodiment, the auger 404 has a left section and a right section, and the helical screw blade in each section is mounted so that rotation of the auger (in one predetermined rotating direction) moves crop material towards a central part of the header 400. This technique is known in auger-type headers and is therefore not explained in further detail in the present description. In other embodiments, such movement of the harvested crop material toward the discharge opening 414 may be accomplished by belt conveyers, air movement, vibrating plates, or fixed structures. In some embodiments, at least one additional conveyor 416 is included in front of the auger 404 in order to encourage movement of the harvested crop material from the point of cutting into the crop transport assembly 422.

The agricultural header 400 further includes a cutting member, which in the illustrated embodiment is configured as a cutter bar 402. The cutter bar 402 is located, in operation of the agricultural header 400, close to a ground surface and is provided to sever the plant standing crop material at a location close to the ground. In general, the cutter bar 402 may have any suitable configuration that allows it to function as described herein. For instance, the cutter bar 402 may include one or more stationary and/or reciprocating blades configured to contact and sever standing crop materials.

Additionally, in accordance with aspects of the present subject matter, one or more vibration sources 104 of the disclosed system 100 may be operatively coupled to the cutter bar 402 for generating a vibrational output(s) that is transmitted to the cutter bar 402 for vibrating the cutter bar 402 as it is being used to perform a cutting operation. For instance, as indicated above, the vibration source 104 may be configured to generate a vibrational output at an output frequency within the ultrasonic frequency range, such as at a range between 10 MHz and 520 MHz. As shown in the illustrated embodiment, a single vibration source 104 is provided in operative association with the cutter bar 402. However, in other embodiments, any number of vibration sources 104 may be provided in operative association with the cutter bar 402, such as by spacing a plurality of vibration sources apart from one another along a length L of the cutter bar 402.

As indicated above and as shown in FIG. 3, the vibration source(s) 104 of the disclosed system 100 may be communicatively coupled to a controller 110 (e.g., via a suitable communicative link 112) to allow the controller 110 to directly or indirectly control the operation of the vibration source 104. For instance, in one embodiment, the controller 110 may be configured to calculate a desired displacement of the cutter bar 402 required to achieve efficient severing of the encountered standing plant material and determine the vibrational output(s) of the vibrational output required to produce the calculated displacement. In such an embodiment, the controller 110 may be configured to control the output of the vibration source 104 to produce the desired vibrational output, which may then be propagated along the length L of the cutter bar 402 to provide the desired vibration of the cutter bar 402.

Figure 4:
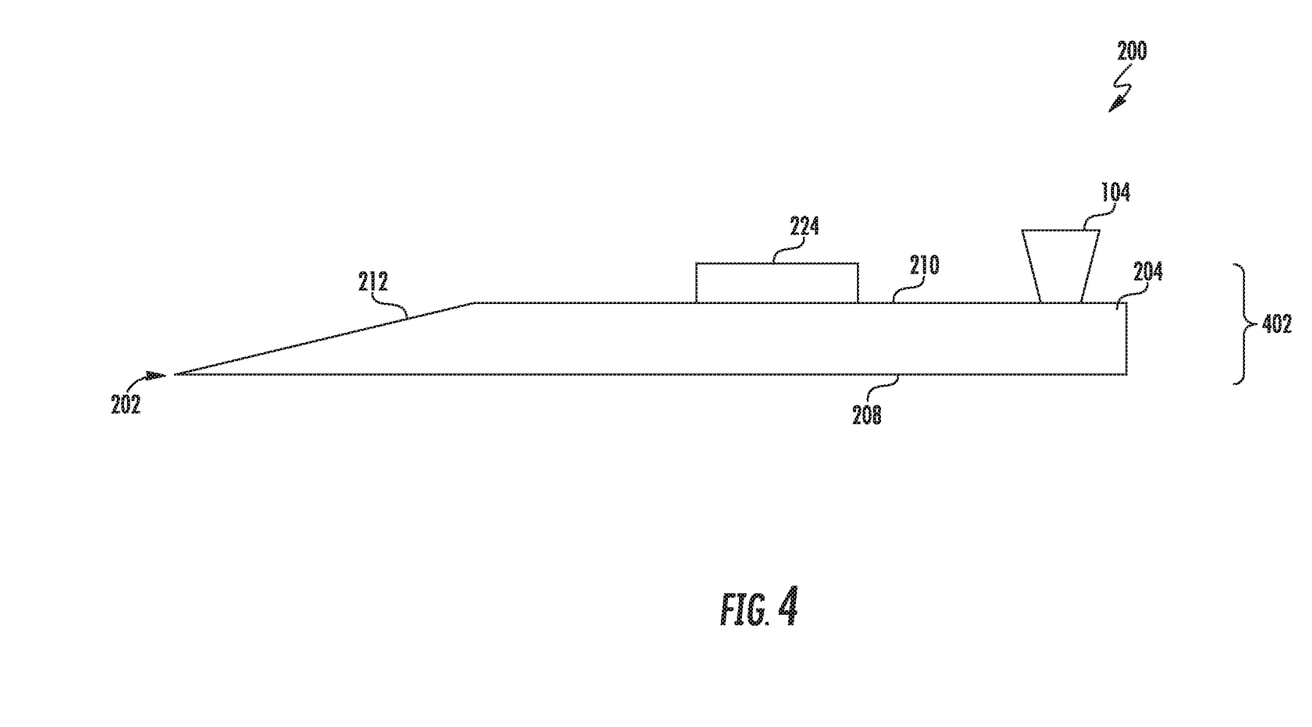
FIG. 4 illustrates a profile view of an embodiment of the cutting member of FIG. 3 in accordance with aspects of the present subject matter.

Additionally, as shown in FIG. 4, one or more vibrational isolators 108 may be provided in operative association with the cutter bar 402 for reducing the amount of vibrations transmitted from the cutter bar 402 to other components of the header 400. For instance, in the illustrated embodiment, vibrational isolators 108 are provided at each end of the cutter bar 402 to isolate the cutter bar 402 from adjacent component of the frame 106, such as the adjacent side frame members 408, 410. However, in other embodiments, the vibrational isolators 108 may be installed at any other suitable locations relative to the cutter bar 402 and/or the vibration source 104.

Referring now to FIG. 4, a profile view of one embodiment of the cutter bar 402 shown in FIG. 3 is illustrated in accordance with aspects of the present subject matter. As shown, the cutter bar 402 generally includes a blade 204 having a distal cutting edge 202. As shown in FIG. 4, the blade 204 has a first side surface 208 and a second side surface 210 opposite the first side surface 208 and substantially parallel thereto, with a portion 212 of the second side surface 210 being formed so as to establish a cutting plane configured to intercept the first side surface 208 and establish the cutting edge 202. In certain embodiments, the cutting edge 202 is formed with a plurality of hollows 216 (FIG. 3) extending perpendicularly to the cutting edge 202. In the illustrated embodiment, the cutter bar 402 is configured as a single-blade cutter bar. However, in other embodiments, the cutting member 200 may have a dual-blade configuration, such as by including a second blade 206 (FIG. 5) positioned adjacent to the blade 204 and extending along the length L of the cutter bar As shown in FIG. 4, in one embodiment, the vibration source 104 may be configured to be installed relative to the blade 204 of the cutter bar 402 at or adjacent to one of the opposed side surfaces 208, 210 of the blade 204, such as the top or second side surface 210. In such an embodiment, the vibration source 104 may be positioned relative to the side surface 208, 210 such that the vibrational output from the vibration source 104 is transmitted to the blade 204 and subsequently propagated therethrough to vibrate the blade 204 along the length of the cutter bar 402.

Additionally, as shown in FIG. 4, in one embodiment, an actuator 224 may be coupled to the blade 204 to drive a reciprocal oscillation of the blade 204 along the length L of the cutter bar 402. For instance, the actuator 224 may be configured to oscillate the blade 204 in a direction generally parallel to length L of the cutter bar 402. In embodiments in which the cutter bar 402 has a dual-blade configuration, the actuator 402 may be configured to only reciprocate one of the blades relative to the other (such that one blade remains stationary) or the actuator may be configured to reciprocate both blades relative to each other.

Figure 5:
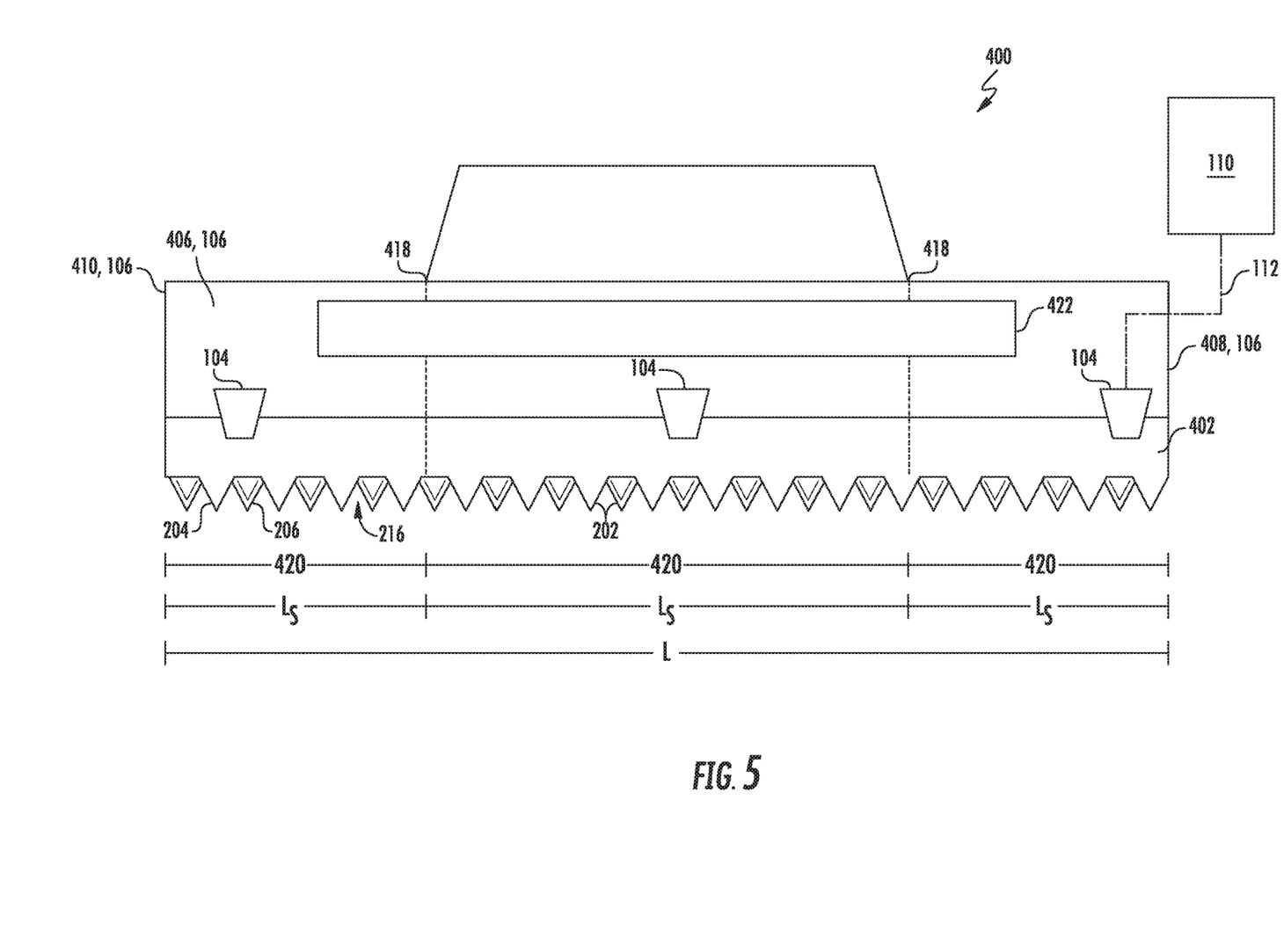
FIG. 5 illustrates a simplified view of another embodiment of the header shown in FIG. 2, particularly illustrating the cutting member configured as a serrated cutter having at least one cutter bar segment.

Referring now to FIG. 5, an alternative embodiment of the header 400 of the harvester shown in FIG. 2 is illustrated in accordance with aspects of the present subject matter, particularly illustrating aspects of the disclosed system 100 incorporated within or otherwise provided in association with the header 400. In general, the header 400 is configured similarly to the header described above with reference to FIG. 3. For instance, the header 400 includes a frame 106 having one or more structural frame members (e.g., a base frame member 406 and opposed side frame members 408, 410) configured to support the various other components of the header (e.g., the cutter bar 402 and one or more components of the crop transport assembly 422, such as one or more augers, conveyors, etc.). However, in the illustrated embodiment, the header 400 includes at least one hinge section 418 to allow the header 400 to be folded into a more compact configuration when desired. In such an embodiment, one or more components of the header 400 may be divided into sections or segments at the hinge sections 418. For instance, as shown in FIG. 5, the cutter bar 402 is divided into multiple cutter bar segments 420 along its overall cutter bar length L with the cutter bar segments 420 each defining short segment lengths $L_S$. In such an embodiment, the cutter bar length L is greater than the segment length $L_S$.

Additionally, as shown in FIG. 5, when incorporating the disclosed system 100 into the illustrated embodiment of the header 400, it may be desirable to provide at least one vibration source 104 in operative association with each cutter bar segment 420 to allow such segment 420 to be vibrated along its length $L_S$. As a result, by individually vibrating the separate cutter bar segments 420, the cutter bar 402 can be vibrated along its entire length L.

Figure 6:
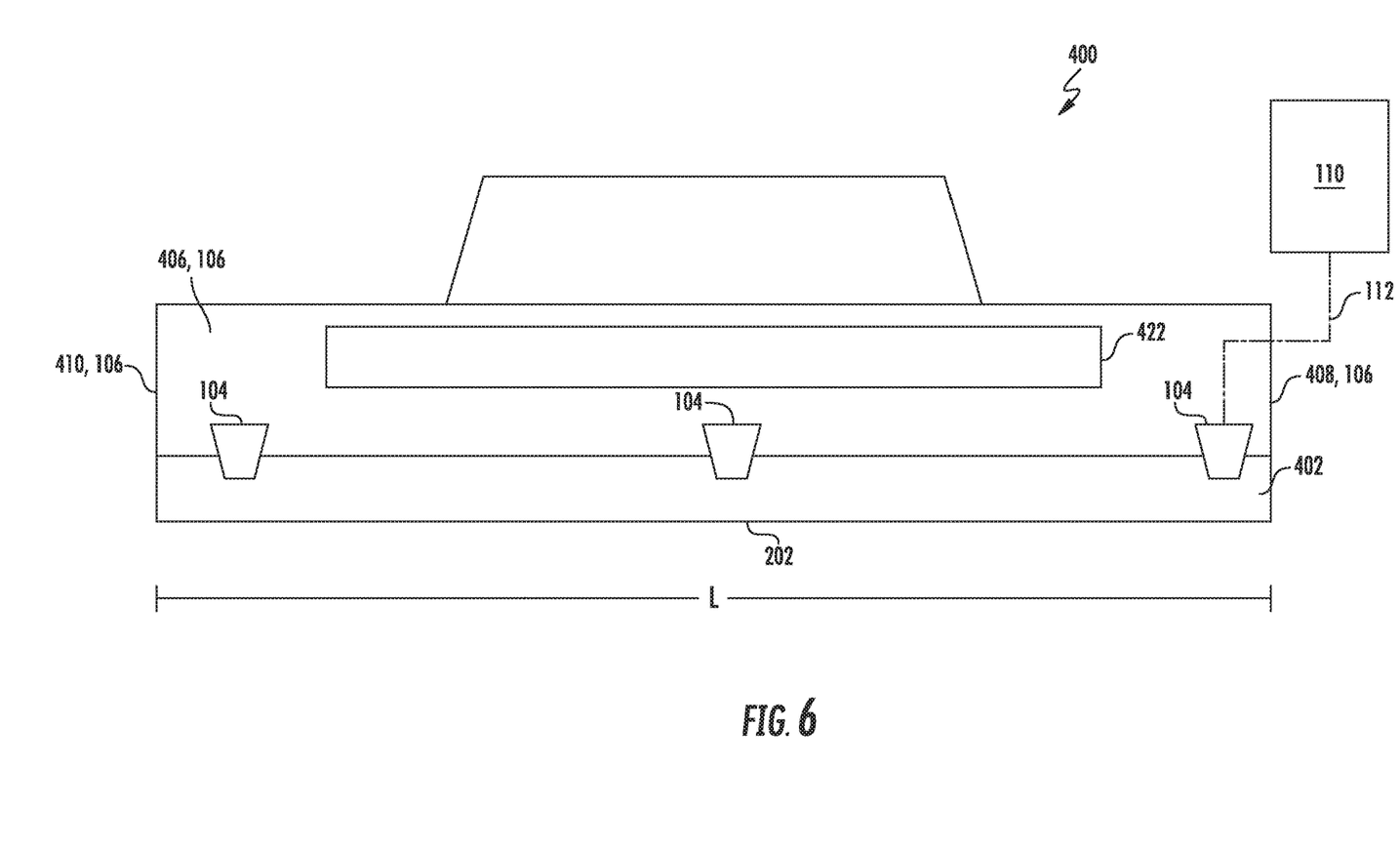
FIG. 6 illustrates a simplified view of another embodiment of the header shown in FIG. 2, particularly illustrating the cutting member configured as a straight cutter.

Referring now to FIG. 6, an alternative embodiment of the header 400 of the harvester shown in FIG. 2 is illustrated in accordance with aspects of the present subject matter, particularly illustrating aspects of the disclosed system 100 incorporated within or otherwise provided in association with the header 400. In general, the header 400 is configured similarly to the header described above with reference to FIG. 3. For instance, the header 400 includes a frame 106 having one or more structural frame members (e.g., a base frame member 406 and opposed side frame members 408, 410) configured to support the various other components of the header (e.g., the cutter bar 402 and one or more components of the crop transport assembly 422, such as one or more augers, conveyers, etc.). However, in the illustrated embodiment, the cutter bar 402 is a single blade, the cutting edge 202 is straight (i.e., formed without hollows) and the actuator for creating a reciprocal oscillation is omitted. As a result, the primary motion at the cutting edge 202 is a result of the forward motion 302 of the agricultural harvester 300 and the displacement resulting from the oscillations produced by the vibration source(s) 104. As shown in FIG. 6, in the illustrated embodiment, a plurality of vibration sources 104 are provided in association with the cutter bar 402 along its length L.

Figure 7:
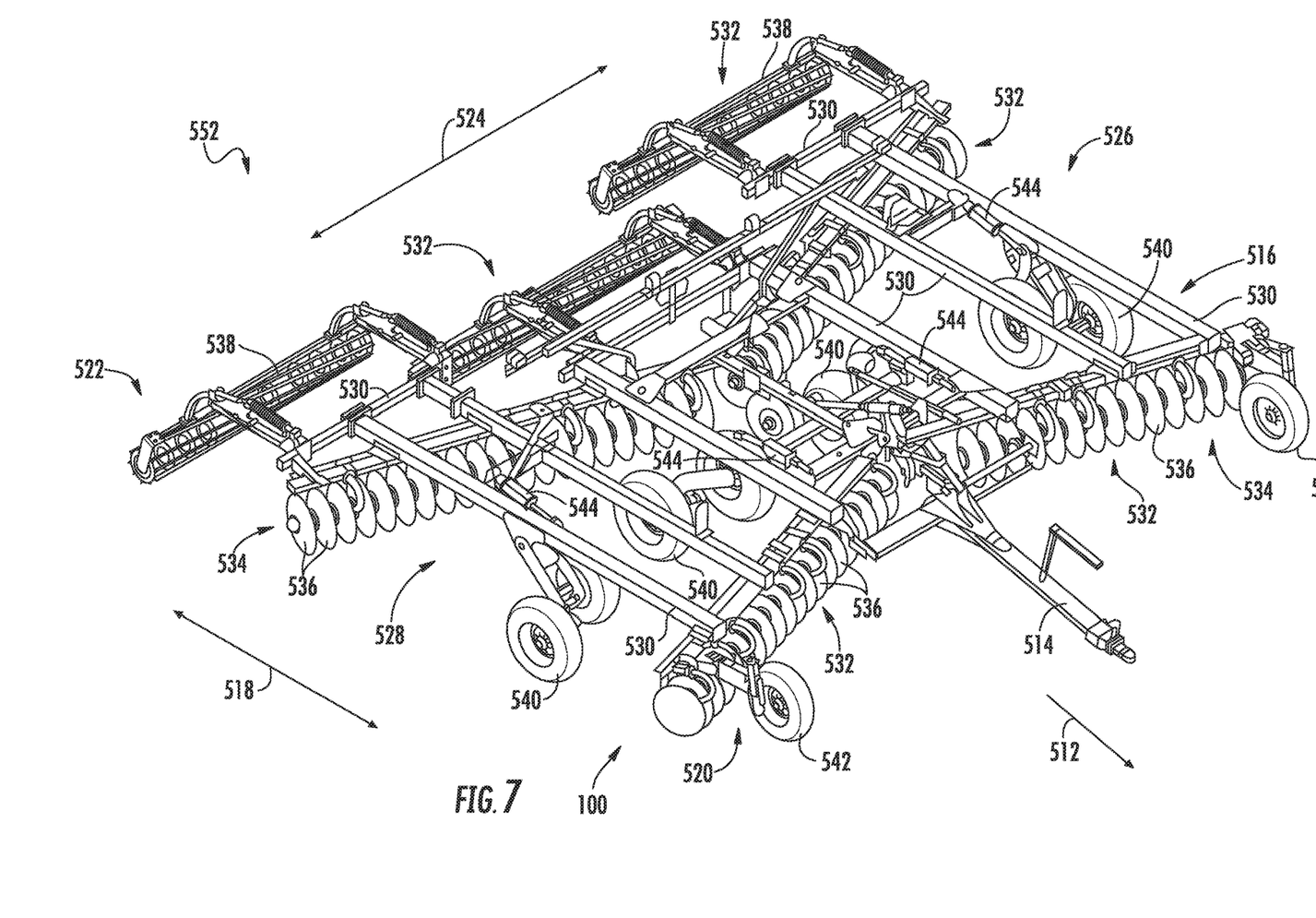
FIG. 7 illustrates an isometric view of one embodiment of a tillage implement, particularly illustrating the tillage implement including one or more components upon which one or more ultrasonic cutting members can be installed in accordance with aspects of the present subject matter.

Referring now to FIG. 7, another embodiment of an agricultural implement in which aspects of the disclosed system 100 may be utilized is illustrated in accordance with aspects of the present subject matter. Specifically, in the illustrated embodiment, the implement corresponds to a tillage implement 552. In general, the tillage implement 552 may be configured to be towed along a direction of travel 512 by a work vehicle (not shown), such as a tractor or other agricultural work vehicle. For example, the work vehicle may be coupled to the tillage implement 552 via a hitch assembly 514 or using any other suitable attachments means. As shown, the hitch assembly 514 may be coupled to a frame 516 of the tillage implement 552 to facilitate towing the tillage implement 552 in the direction of travel 512.

As shown, the frame 516 may extend in a longitudinal direction (e.g., as indicated by arrow 518 in FIG. 7) between a forward end 520 and an aft end 522. The frame 516 may also extend in a lateral direction (e.g., as indicated by arrow 524 in FIG. 7) between a first side 526 and a second side 528. In addition, the frame 516 may generally include a plurality of structural frame members 530, such as beams, bars, and/or the like, configured to support or couple to a plurality of components, such as various ground-engaging tools 532.

For example, in one embodiment, the frame 516 may be configured to support one or more gangs or individually mounted sets 534 of disc blades 536. In such an embodiment, each disc blade 536 may, for example, include both a concave side (not shown) and a convex side (not shown). In addition, the gangs 534 of disc blades 536 may be oriented at an angle relative to the travel direction 512 to promote more effective tilling of the soil. However, it should be appreciated that the frame 516 may support any suitable ground-engaging tools 532 or combination of ground-engaging tools 532. For example, in alternate embodiments, the frame 516 may support various shanks, leveling blades, tines, and/or the like.

Moreover, in one embodiment, the tillage implement 552 may optionally include additional ground-engaging tools 532, such as one or more baskets or rotary firming wheels 538. As is generally understood, the baskets 538 may be configured to reduce the number of clods in the soil and/or firm the soil over which the tillage implement 552 travels. As shown, each basket 538 may be configured to be pivotally coupled to one of the frame 516. Alternately, the baskets 538 may be configured to be pivotally coupled to any other suitable location of the tillage implement 552, such as a harrow (not shown) coupled to the frame 516. It should be appreciated that the tillage implement 552 may include any suitable number of baskets 538. In fact, some embodiments of the tillage implement 552 may not include any baskets 538.

The tillage implement 552 may further include various wheel assemblies coupled to the frame 516 to support the frame 516 relative to the ground and to facilitate towing the tillage implement 552 in the direction of travel 512. Specifically, in several embodiments, the tillage implement 552 may include a plurality of center support wheel assemblies 540 spaced apart from one another in the lateral direction 524 of the tillage implement 552 and a plurality of forward support wheel assemblies 542 coupled to the frame 516 proximate to the forward end 520 of the frame 516. It should be appreciated that the tillage implement 552 may include any suitable number and/or type of wheel assemblies in alternate embodiments.

Additionally, the tillage implement 552 may also include any suitable number of actuators for adjusting the relative positioning between various components of the tillage implement 552. For instance, as shown, the tillage implement 552 may include a plurality of fluid-driven actuators 544 coupled between the center support wheel assemblies 540 and the frame 516 for raising and lowering the frame 516 relative to the ground.

Additionally, in accordance with aspects of the present subject matter, one or more components of the disclosed system 100 may be incorporated into or otherwise provided in associated with the tillage implement 552. For instance, in several embodiments, one or more vibration sources may be provided in operative association with one or more of the ground-engaging tools to serve as a source of vibrational energy, thereby vibrating the tools as they penetrate or otherwise engage the ground. For instance, as will be described below with reference to FIG. 8, a vibration source(s) 104 may be provided in operative association with each disc blade 536 or set of disc blades 536 to vibrate the blade(s) 536 as it is being used to sever or cut crop residue and/or other plant materials located on top of and/or within the soil.

It should be appreciated that the configuration of the tillage implement 552 described above and shown in FIG. 7 is provided only to place the present subject matter in an exemplary field of use. Thus, it should be appreciated that the present subject matter may be readily adaptable to any manner of implement configuration.

Figure 8:
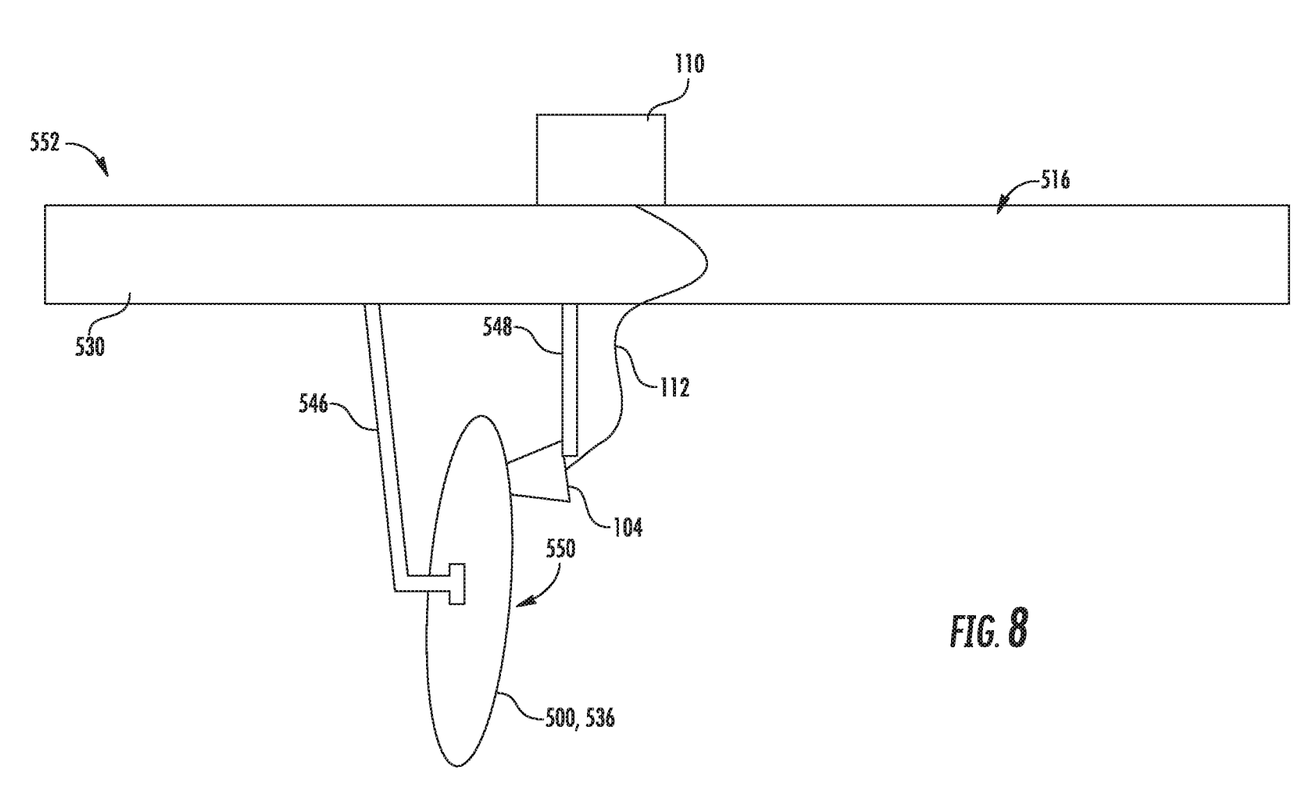
FIG. 8 illustrates a simplified view of one embodiment of a ground engagement tool of the tillage implement of FIG. 7, particularly illustrating the ground engaging tool as an ultrasonic cutting member in accordance with aspects of the present subject matter.

Referring now to FIG. 8, a schematic view of one embodiment of a ground-engaging tool 500 in which aspects of the disclosed system 100 have been incorporated therewith is illustrated in accordance with aspects of the present subject matter. Specifically, in the illustrated embodiment, the ground-engaging tool 500 is configured as one of the blade discs 536 of the tillage implement 552 described above with reference to FIG. 7. However, in other embodiments, the ground-engaging tool 500 may correspond to any other suitable ground-engaging tool, such as any other suitable ground-engaging tool of a given tillage implement or any suitable ground-engaging tool of any other type if implement (e.g., a planting implement).

As shown in the illustrated embodiment, the ground-engaging tool 500 is supported relative to a structure frame member 530 of the frame 516 (e.g., a toolbar) of the tillage implement 552 for rotation relative thereto via a support arm 546. Additionally, a vibration source 104 of the disclosed system 100 is supported relative to the frame 516 (e.g., via vibration support arm 548) at a location at or adjacent to the ground-engaging tool 500 to allow the vibrational output from the vibration source 104 to be transmitted to the tool 500. For instance, in one embodiment, the vibration source 104 may be positioned relative to the ground-engaging tool 500 such that the vibration source 104 is in sliding contact or otherwise positioned adjacent to a disc face 550 of the tool 500. However, in other embodiments, the vibration source 104 may be installed on the tillage implement 552 at any other suitable location and/or using any other suitable attachment structure that allows the vibration source 104 to function as a source of vibrational energy for vibrating the ground-engaging tool 500.

Figure 9:
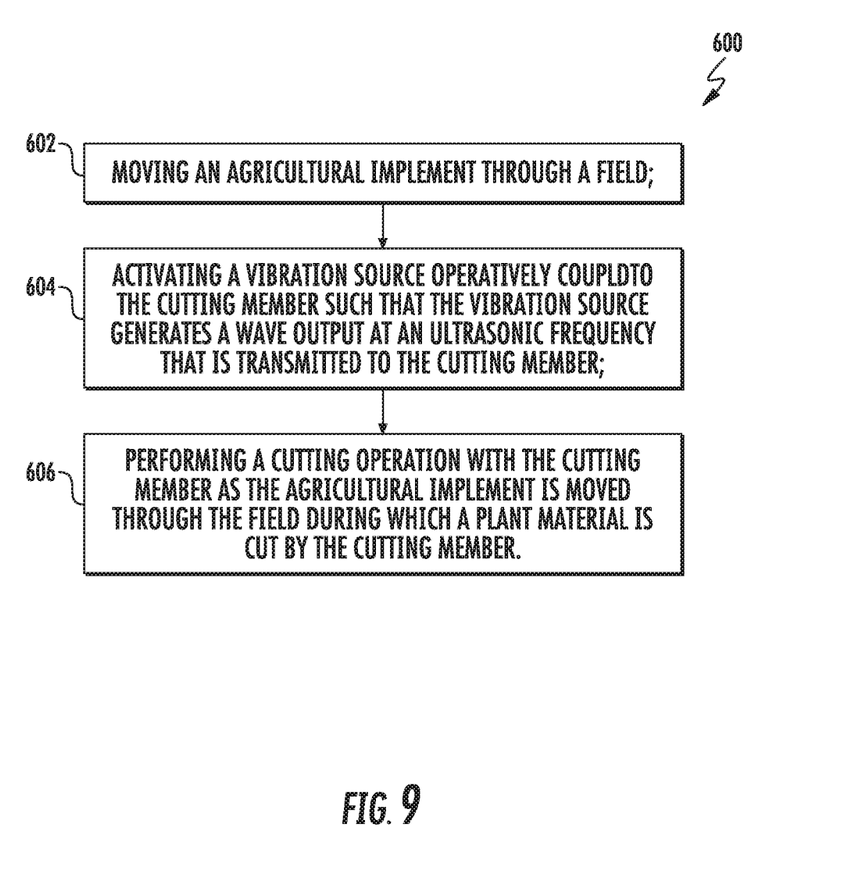
FIG. 9 illustrates a flow diagram of one embodiment of a method for performing cutting operations with an agricultural implement in accordance with aspects of the present subject matter.

It should be appreciated that, when utilizing aspects of the presently disclosed system 100 to configure the ground-engaging tools of an implement (e.g., the tillage implement 552 of FIG. 7) as ultrasonic cutting members, separate vibration sources 104 may be provided in operative association with each tool that is desired to be vibration or one or more vibration sources 104 may be utilized as a common source of vibrational energy for a group of ground-engaging tools (e.g., tools ganged together on a toolbar Referring now to FIG. 9, a flow diagram of one embodiment of a method 600 for performing cutting operations with an agricultural implement is illustrated in accordance with aspects of the present subject matter. In general, the method 600 will be described herein with reference to the system 100 described above with reference to FIG. 1. However, it should be appreciated by those of ordinary skill in the art that the disclosed method 600 may be implemented within any other system having any other suitable system configuration. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 9, at (602), the method 600 includes moving an agricultural implement through a field. As indicated above, the agricultural implement may, for example, include a cutting member configured to cut or sever plant materials, such as a cutter bar, a ground-engaging tool and/or any other suitable cutting device.

Additionally, at (604), the method 600 includes activating a vibration source operatively coupled to the cutting member such that the vibration source generates a vibrational output at an ultrasonic frequency that is transmitted to the cutting member. Specifically, as indicated above, a vibration source (s) may be provided in association with the cutting member (s) of the agricultural implement to allow an ultrasonic vibrational output to be transmitted to the cutting member.

Moreover, at (606), the method 600 includes performing a cutting operation with the cutting member as the agricultural implement is moved through the field. Specifically, as the implement is moved across the field, the cutting member may be used to cut or sever plant material. In doing so, the vibrational output generated by the vibration source may be propagated through at least a portion of the cutting member to vibrate the cutting member during the performance of the cutting operation, thereby enhancing the cutting efficiency and/or effectiveness of the cutting member.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A harvesting implement for an agricultural harvester, the harvesting implement comprising:

a frame extending in a lateral direction between a first side and a second side and in a fore-to-aft direction between a front end and a rear end, the frame comprising a base frame member including opposed first and second lateral ends, the base frame member extending in the lateral direction such that the first lateral end is positioned adjacent to the first side of the frame and the second lateral end is positioned adjacent to the second side of the frame, the frame comprising a first side frame member disposed at the first lateral end of the base frame member and extending in the fore-to-aft direction between the front and rear ends of the frame, the frame further comprising a second side frame member disposed at the second lateral end of the base frame member and extending in the fore-to-aft direction between the front and rear ends of the frame, the first side frame member spaced apart in the lateral direction from the second side frame member by a lateral length;

a cutter bar supported adjacent to the front end of the frame and including a first end coupled to the first side frame member and an opposed second end coupled to the second side frame member, the cutter bar extending in the lateral direction between the first and second side frame members along the lateral length, the cutter bar being configured to perform a cutting operation as the harvesting implement is moved across a field during which the cutter bar severs a standing plant material from the field;

a crop transport assembly supported by the frame aft of the cutter bar in the fore-to-aft direction such that the crop transport is positioned closer to the rear end of the frame than the cutter bar, the crop transport assembly being configured to transport the severed plant material away from the cutter bar and towards a discharge opening of the harvesting implement for subsequent delivery to a feeder of an agricultural harvester; and a vibration source operatively coupled to the cutter bar, the vibration source configured to generate a vibrational output at an ultrasonic frequency that is transmitted to the cutter bar, wherein the vibrational output is propagated through at least a portion of the cutter bar to vibrate the cutter bar as the standing plant material are being severed from the field during the performance of the cutting operation.

2. The harvesting implement of claim 1, wherein the vibrational output has a frequency between 10 MHz and 20 MHz.

3. The system of claim 1, wherein the cutter bar comprises at least one reciprocating blade.

4. The harvesting implement of claim 1, wherein the frame comprises one or more hinge sections and the cutter bar is divided into two or more blade segments at the one or more hinge sections.

5. The harvesting implement of claim 1, wherein the vibration source is one of a plurality of vibration sources operatively coupled to the cutter bar, the plurality of vibration sources being spaced apart along the lateral length of the cutter bar.

6. The harvesting implement of claim 1, further comprising at least one vibrational isolator coupled between the cutter bar and the frame to reduce an amount of vibrational energy transmitted from the cutter bar to the frame.

7. The harvesting implement of claim 6, wherein the at least one vibrational isolator comprises a first vibrational isolator coupled between the first side frame member and the first end of the cutter bar and a second vibrational isolator coupled between the second side frame member and the second end of the cutter bar.

8. The harvesting implement of claim 6, wherein the vibrational isolator comprises a rubber-based vibrational isolator.

9. The harvesting implement of claim 1, wherein the cutter bar comprises at least one non-reciprocating blade.

10. The harvesting implement of claim 1, further comprising a controller configured to activate the vibration source when the cutter bar is being used to perform the cutting operation and deactivate the vibration source during non-operational periods.

* * * * *